United States Patent [19]
Baker

[11] Patent Number: 4,813,769
[45] Date of Patent: * Mar. 21, 1989

[54] LIQUID CRYSTAL WAVE DIVISION DEVICE

[75] Inventor: Anthony P. Baker, New York, N.Y.

[73] Assignee: ITT Defense Communications, a division of ITT Corporation, Nutley, N.J.

[*] Notice: The portion of the term of this patent subsequent to Nov. 15, 2005 has been disclaimed.

[21] Appl. No.: 795,154

[22] Filed: Nov. 5, 1985

[51] Int. Cl.⁴ .............................................. G02F 1/133
[52] U.S. Cl. ................................ 350/347 E; 350/337; 350/347 R; 350/348
[58] Field of Search ............... 350/347 R, 331 R, 337, 350/347 E, 342, 352, 348

[56] References Cited

U.S. PATENT DOCUMENTS

| | | | |
|---|---|---|---|
| 4,232,948 | 11/1980 | Shanks | 350/347 R |
| 4,461,542 | 7/1984 | Gagnon | 350/331 R |
| 4,478,494 | 10/1984 | Soref | 350/347 E |

OTHER PUBLICATIONS

J. Appl. Phys., vol. 44, No. 11, Nov. 1973, p. 4799, Scheffer, T. J., "New Multicolor Liquid Crystal Displays that use a Twisted Nematic Electro-Optical Cell", 350/347R.

Chabicovsky et al., "Liquid Crystal Cells with Special Electrodes for Generation of Uniform Colors by Optical Birefringence," Conference Record of 1976 Biennial Display Conference of the Sid, Oct. 1976, p. 61, 350/347R.

Primary Examiner—John K. Corbin
Assistant Examiner—Martin Lerner
Attorney, Agent, or Firm—Robert A. Walsh; Thomas N. Twomey; Mary C. Werner

[57] ABSTRACT

A liquid crystal wave division device includes first and second polarization changing cells, the polarization changing cells utilize homogeneously aligned nematic liquid crystal material to effect the change of polarization of a preselected frequency portion of a multifrequency incident light beam.

19 Claims, 3 Drawing Sheets

LIQUID CRYSTAL WAVE DIVISION DEVICE

CROSS-REFERENCE TO RELATED APPLICATIONS:

This application is related to one, or more, of the following United States Patent Applications: Ser. No. 795,156; Ser. No. 795,151; Ser. No. 595,150; Ser. No. 795,149; Ser. No. 795,155; Ser. No. 795,138; Ser. No. 795,148; Ser. No. 795,157; Ser. No. 795,152; Ser. No. 795,296 all filed on even date herewith. All of the above applications are assigned to the assignee hereof.

BACKGROUND OF THE INVENTION

The present invention generally relates to a liquid crystal wave division device and, in particular, relates to one such liquid crystal wave division device having means for selectively changing the polarization of the separated components of an incident light beam of a preselected wavelength.

The use of optical fibers as a telecommunication and transmission medium has numerous advantages compared to existing telecommunication and transmission media. For example, optical fibers can sustain a broader bandwidth signal and hence can convey larger quantities of information over the same period of time than existing media. Further, light waves are shorter than the conventional microwaves commonly used in existing telecommunication systems and thus a substantial reduction in the physical size of components is readily achievable. This further results in a cost reduction for materials, packaging and manufacturing. Still further, current optical fibers exhibit little or no electromagnetic radiation or radio frequency radiation thus resulting in negligible impact on the surrounding environment. In addition, optical fibers are relatively insensitive to radio frequency interference from surrounding devices or systems.

To be viable, every telecommunication system must include some means for controllably redirecting a signal, or at least a portion thereof, to or from a transmission media or between one or more such medium. In the case of an optical telecommunication system the preferred means is an optical switch. Currently, optical switches are generally mechanical in nature.

However, mechanical switches require relatively high driving power and are subject to wear, abrasion and fatigue. As a result, mechanical switches are prone to failure after repeated use. In addition, since a rather small optical fiber is usually displaced from alignment with one port fiber into alignment with another port fiber, mechanical switches can easily become expensive. One particular reason for this expense is the very small tolerances required to ensure the proper alignments between the optical fiber moved and the optical fibers of the ports.

Recently, liquid crystal optical switching devices have been proposed as an alternative to mechanical switches. Typical of liquid crystal optical switches proposed to date are those described in U.S. Pat. No. 4,201,422 issued to McMahon et al. on May 6, 1980, U.S. Pat. No., 4,278,327 issued to McMahon et al. on July 14, 1981, and U.S. Pat. No. 4,385,799 issued to Soref on May 31, 1983. Therein, a plurality of liquid crystal switch designs are described wherein optical fibers are attached to the side angled surfaces of a pair of opposing trapezoidal prisms. The trapezoidal prisms are arranged with the bases thereof parallel and with liquid crystal material positioned therebetween.

Although the optical switches described in these references have some advantages over mechanical switches, specifically no moving parts, these liquid crystal switches are both difficult to manufacture and expensive since all the surfaces of the trapezoidal prisms must be optically flat and be fixed at a precise angular relation to each other. As a result, the liquid crystal optical switches, as described in the above references, are presently impractical for optical communication systems.

Further, it is frequently desirable, in optical communication systems to separate, or mix, a signal having a particular frequency from/to other optical signals having different frequencies. For example, the destination, or source, of a particular message or information signal can be frequency dependent. At the present time, such multiplexing/demultiplexing of optical signals is performed by, for example, star couplers, or the like. These optical multiplexers/demultiplexers are both complex and expensive.

Consequently, since a typical telecommunications network may include hundreds, if not thousands, of switching devices, a low cost, readily manufactured liquid crystal wave division device is needed in order to more fully realize the advantages of an optical telecommunication system.

SUMMARY OF THE INVENTION

Accordingly, it is one object of the present invention to provide a relatively inexpensive liquid crystal wave division device that is amenable to mass production techniques.

This object is accomplished, at least in part, by a liquid crystal wave division device having means for selectively changing the polarization of the components of a separated incident light beam of a particular wavelength.

Other objects and advantages of the present invention will become apparent to those skilled in the art from the following detailed description read in conjunction with the appended claims and the drawing attached hereto.

DETAILED DESCRIPTION OF THE INVENTION

Figure 1:
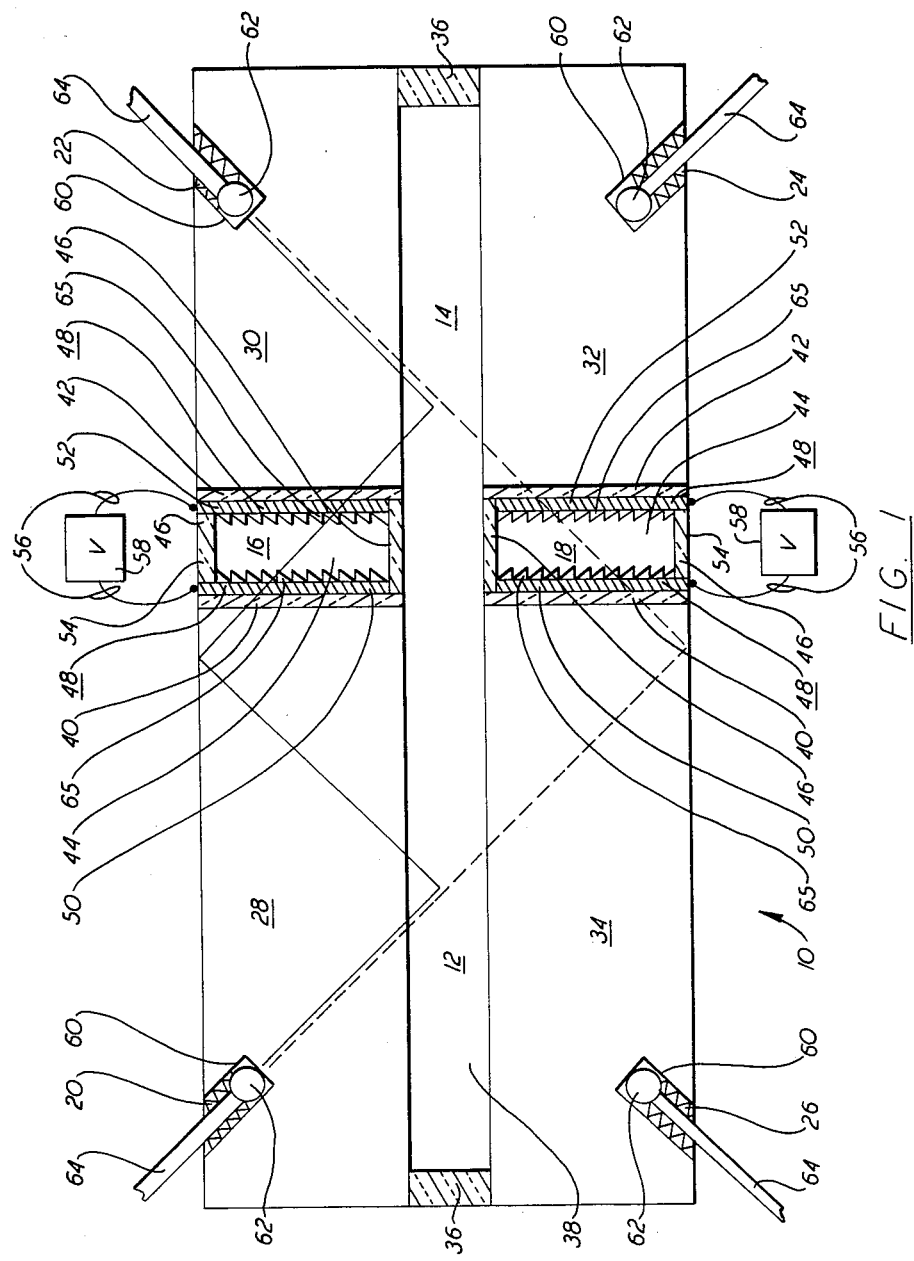
FIG. 1 is a cross sectional view, not drawn to scale, of a liquid crystal wave division device embodying the principles of the present invention and showing a first optical path for an incident light beam.
Figure 2:
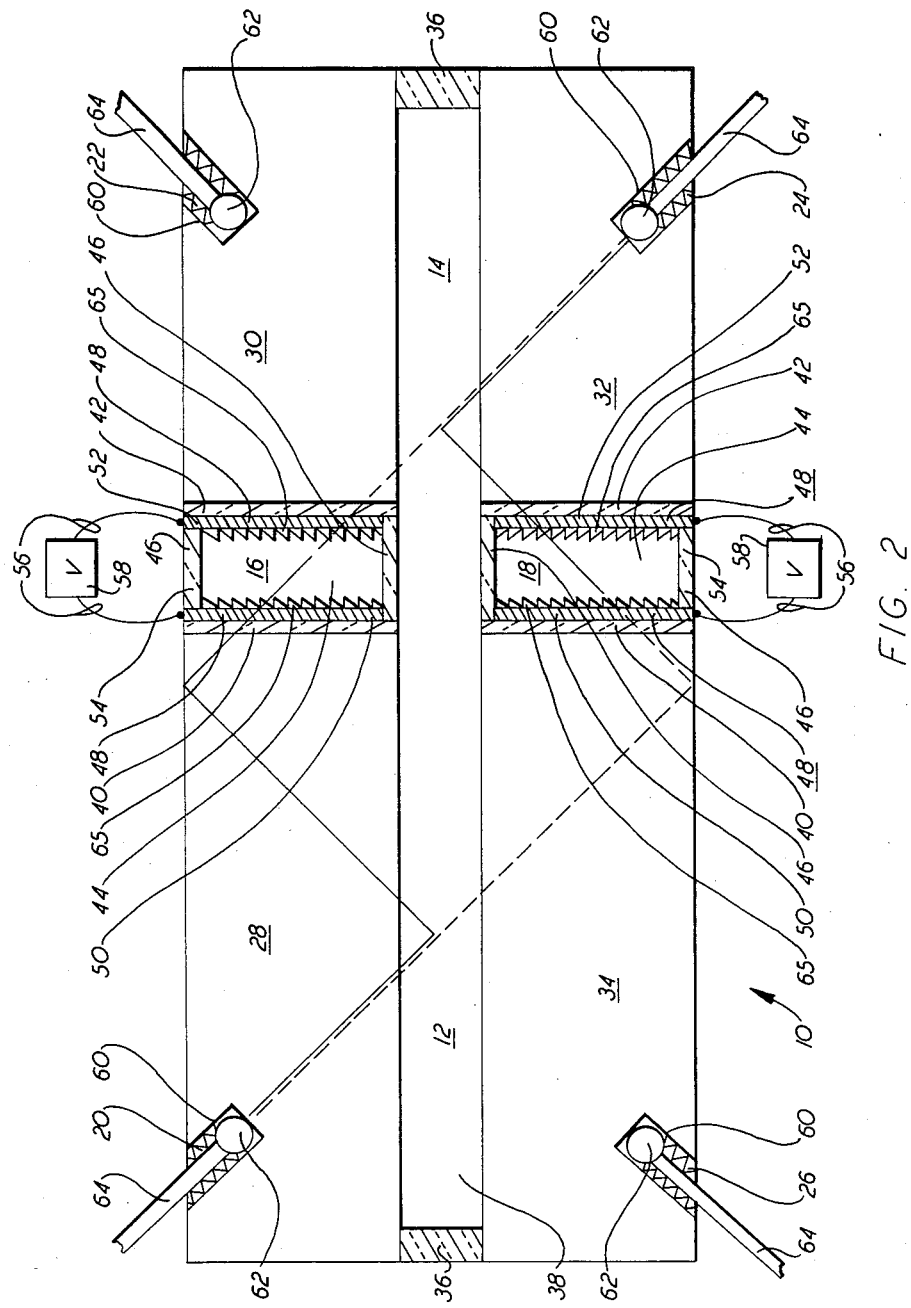
FIG. 2 is a cross sectional view of the device shown in FIG. 1 showing a second optical path for a particular frequency portion of the incident light beam.

A liquid crystal wave division device, generally indicated at 10 in FIGS. 1 and 2 of the drawing and embodying the principles of the present invention, includes means 12 for splitting a multifrequency light beam into polarized components thereof, means 14 for recombining the polarized components, first means 16, positioned in the path of one of the polarized components, for selectively changing the polarization of a preselected frequency portion thereof and second means 18, positioned in the path of the other one of the polarized components, for selectively changing the polarization of the preselected frequency portion thereof, whereby the recombined components of the preselected frequency portion can be directed along a selected optical path.

Preferably, the device 10 further includes at least a first input port 20 and first and second output ports, 22 and 24, respectively. In the embodiment shown in FIGS. 1 and 2, the device 10 further includes a second input port 26. In addition, each port, 20, 22, 24 and 26, is associated with first through fourth transparent members, 28, 30, 32 and 34, respectively. Preferably, two of members, 28 and 34, provide means for redirecting the polarized components toward the means 14 for recombining the polarized components.

In one implementation, the means 12 for splitting the multifrequency incident light beam includes a liquid crystal beam splitter. As more fully discussed below the liquid crystal beam splitter is, preferably, disposed such that a light beam conveyed to the device 10 by the first input port 20 thereof is incident thereon at an angle somewhat greater than the critical angle. Further, the liquid crystal beam splitter can either be defined by a means 36 for retaining a liquid crystal material 38 between the members, for example, between the first and fourth transparent members, 28 and 34, respectively or alternatively, the liquid crystal beam splitter can be a discrete element, or cell, that is self-contained. Preferably, the liquid crystal material is a nematic type, although other types of liquid crystal material may also be used. A discrete cell beam splitter is preferred because the ease of fabrication of the device 10 is improved.

In one particular embodiment, the means 14 for recombining the polarized components is identical to the means 12 for splitting a light beam. In fact, the means 12 for splitting a light beam and the means 14 for recombining the components thereof can be a single discrete cell. One such discrete cell particularly adaptable for use in the device 10 is discussed and described in U.S. patent application Ser. No. 795,150 entitled Liquid Crystal Cell for Use in an Optical Switch filed on even date herewith and assigned to the assignee hereof. This application is deemed incorporated herein by reference. Therein, a discrete liquid crystal beam splitter is discussed that includes a pair of glass slides having, for example, a nematic liquid crystal material retained therebetween. Since such cells are inherently bidirectional such a discrete cell is directly applicable for the means 12 for splitting a light beam and as the means 14 for recombining the polarized components thereof in the device 10.

In the embodiment shown in FIGS. 1 and 2, the first and second means, 16 and 18, respectively, for selectively changing the polarization of the light beam component of a preselected frequency portion of the multifrequency incident beam passing therethrough are substantially identical. Each of the means, 16 and 18, includes first and second boundary members, 40 and 42, respectively, having a homogeneously aligned, but rotated 45° with respect to the incident light, liquid crystal material 44 disposed therebetween, means 46 for retaining the liquid crystal material 44 therebetween and means 48 for sustaining an electromagnetic field across the nematic liquid crystal material 44. In the preferred embodiment, the liquid crystal material is nematic, although other types of liquid crystal material can also be used. Preferably, each of the means 48 for sustaining an electromagnetic field includes first and second electrodes, 50 and 52, respectively, extending to an edge 54 of the first and second means, 16 and 18, respectively, whereat the electrodes, 50 and 52, can be connected to electrically conductive leads 56 for connecting to a source control voltage 58. As known in the liquid crystal art, a homogeneously aligned nematic liquid crystal material, in general, is one wherein the liquid crystal molecules are oriented parallel to the plane of both of the boundary members, 40 and 42. In this embodiment, the molecules are also rotated 45° with respect to the incident light. When an electromagnetic field is applied thereacross the molecules are reoriented so that they are perpendicular to the boundary members, 40 and 42. In the unpowered condition, i.e., when no electromagnetic field is applied, light of a particular wavelength incident on the liquid crystal material is rotated 90°. That is, the perpendicularly polarized component is rotated so that it becomes parallel polarized and vice versa.

Furthermore, it has been determined that the frequency selectively of a liquid crystal is based upon the following light retardation formula:

$$R = \frac{2\pi \Delta n d}{\lambda}$$

wherein:

R is the retardation of a light wave having a wavelength $\lambda$;

$\Delta n$ is the birefringence of the liquid crystal material; and d is the distance traveled by the light wave in the liquid crystal material.

Thus, if $\Delta n$ is held constant the frequency selectively of the liquid crystal material is determined by the distance d. In addition, the distance d can also be made equal any integer multiple of $\pi$.

With regard to the functional operation of nematic liquid crystal material, it is understood that in an unpowered mode, i.e., when no electromagnetic field is sustained across the twisted nematic liquid crystal, the polarization of the light beam component of the preselected frequency portion traversing that particular cell is rotated 90°, regardless of the polarization thereof. However, in the powered mode, i.e., when an electromagnetic field is sustained across the nematic liquid crystal material, the polarized component entering either one of the means, 16 or 18, for all frequencies is unchanged.

In order to maximize the effect the light wave should be incident normal to the molecules of the liquid crystal material. To ensure that the incident light is normal to the liquid crystal material each of the means, 16 and 18, is provided with an alignment layer 65 disposed at the appropriate angle to orient the molecules of the liquid crystal material normal to the path of the polarized components of the split incident light beam. For example, in a device 10, wherein the critical angle is, for example, about 65°, the alignment layer 65 is formed to orient the liquid crystal molecules 25°. Thus, the split components are incident normal to the oriented molecules.

The alignment layer 65 is preferably a 300 Angstrom thick layer of SiO formed by conventional deposition techniques but with the source and glass slide tilted relative to each other to ensure the appropriate alignment angle.

Consequently, if, for example, the beam incident on the beam splitting means 12 is composed of multiple frequencies, such as, $f_1, f_2, f_3 ... f_n$ and the means, 16 and 18, are sized for $f_1$; then, in the unpowered mode only the $f_1$ portion of the split components have the polarization thereof rotated and, as more fully discussed with respect to FIG. 2, are directed to the second output port 24. The nonselected frequency portions $F_2, F_3 ... f_n$, are unchanged and are directed to the first output port 22. In the powered mode all of the frequency portions of the multifrequency light beam are directed to the first output port 22.

In the preferred embodiment, each port, 20, 22, 24 and 26, is associated with one of the transparent members, 28, 30, 32 and 34, respectively. Each port, 20, 22, 24 and 26, preferably includes a blind hole 60 extending into the associated transparent member, 28, 30, 32 and 34, and a means 62 is disposed therein for collimating a light beam traversing the port, 22, 24, 26 or 28. Each port, 20, 23, 24 and 26, is adapted to receive an optical fiber 64 for connecting the device 10 with an optical system. The use and parameters of recessed ports for connecting optical fibers to a liquid crystal optical switching device is more fully discussed and described in U.S. patent application Ser. No. 795,156 entitled Liquid Crystal Optical Switching Device filed on even date herewith and assigned to the assignee hereof. This application is deemed incorporated herein by reference.

In the device 10 the first and second transparent members, 28 and 30, respectively, include the first input and output ports, 20 and 22, respectively, and are disposed on opposing sides of the first means 16 for selectively changing the polarization of a light beam component of a preselected frequency passing therethrough. In addition, the first preselected frequency polarization changing means 16 and the first and second transparent members, 28 and 30, respectively, are all disposed on one side of the beam splitting means 12 and recombining means 14. In one specific arrangement, the first electrode 50 of the first preselected frequency polarization changing means 16 is oriented proximate the first transparent member 28 and the second electrode thereof is proximate the second transparent member 30. Hence, the first preselected frequency polarization means 16 and the first and second transparent members, 28 and 30, as discrete elements can be preassembled prior to assembly with the discrete beam splitting means 12 and recombining means 14.

Similarly, the third transparent member 32 having the second output port 24 associated therewith, the fourth transparent member 34 having the second input port 26 associated therewith and the second preselected frequency polarization changing means 18 can be preassembled prior to the final assembly of the device 10.

In the embodiments shown in FIGS. 1 and 2, the first and fourth transparent members, 28 and 34, respectively, are cooperatively sized with the first and second preselected frequency polarization changing means, 16 and 18, respectively, and the second and third transparent members, 30 and 32, respectively, such that the polarized components of a multifrequency incident light beam are redirected toward the beam recombining means 14 by the air/member interface thereof prior to traversing the preselected frequency polarization changing means, 16 and 18.

In one specific implementations, the beam splitting means 12 and the beam recombining means 14 includes a nematic liquid crystal material 38 such as EM 1132 manufactured and marketed by E. Merck of Rahway, N.J. The boundary members, 40 and 42, are glass slides having a thickness of about 0.5 millimeters and spaced apart by about 12 micrometers. The nematic liquid crystal material 44 is also, for example, EM 1132 manufactured and marketed by E. Merck of Rahway, N.J. The transparent members, 28, 30, 32 and 34, are, preferably, molded clear plastic.

In operation, the nematic liquid crystal material 38 of the beam splitting means 12 and the beam recombining means 14 characteristically completely reflect perpendicularly polarized light, represented by solid line paths in the drawings, and appear transparent to parallel polarized light, represented by the dashed line paths in the drawings. Hence, when a multifrequency plane polarized light beam is incident on the beam splitting means 12 at an angle equal to, or greater than, the critical angle, the parallel polarized component is substantially completely transmitted therethrough and the perpendicularly polarized component is substantially completely reflected therefrom, i.e., the multifrequency incident light beam is split into two polarized components. Upon being split into the parallel and perpendicular components, the components are directed to the transparent member/air interfaces of the first and fourth transparent members, 28 and 34, respectively, whereat they are redirected, i.e., reflected, through the first and second preselected frequency polarization changing means, 16 and 18, respectively, and recombine in the nematic liquid crystal recombining means 14. Whereafter, in the powered mode as shown in FIG. 1, the recombined light beam exits the device 10 via the first ouput port 22.

Referring now to FIG. 2, wherein the device 10 is depicted in the umpowered mode with a multifrequency incident light beam entering the first input port 20. As shown therein, the multifrequency incident beam is, as always, split into the perpendicular and parallel polarization components thereof. In apposition the powered mode, the perpendicular component is reflected from the first transparent member/air interface and is unchanged when it passes through the first preselected frequency polarization changing means 16, in the unpowered mode, the perpendicularly polarized portion of the preselected light frequency exits the means 16 as a parallel polarized light beam and is thus transmitted directly through the beam recombining means 14 to the second output port 24. In a similar fashion, in the unpowered mode, the initially transmitted parallel component of the preselected frequency is reflected from the second transparent member/air interface through the second polarization changing means 18 exiting as a perpendicularly polarized light beam that is reflected by the beam recombining means 14 and thus directed to the second output port 24. The remaining unselected frequencies of the multifrequency exit via the first output port 22 as shown in FIG. 1. Hence, the application of an electromagnetic field across the first and second preselected frequency polarization changing means, 16 and 18, effects the switching of the recombined light beam of the unselected frequency portion from the second output port 24 to the first output port 22 while the preselected frequency portion continues to exit via output port 24.

Figure 3:
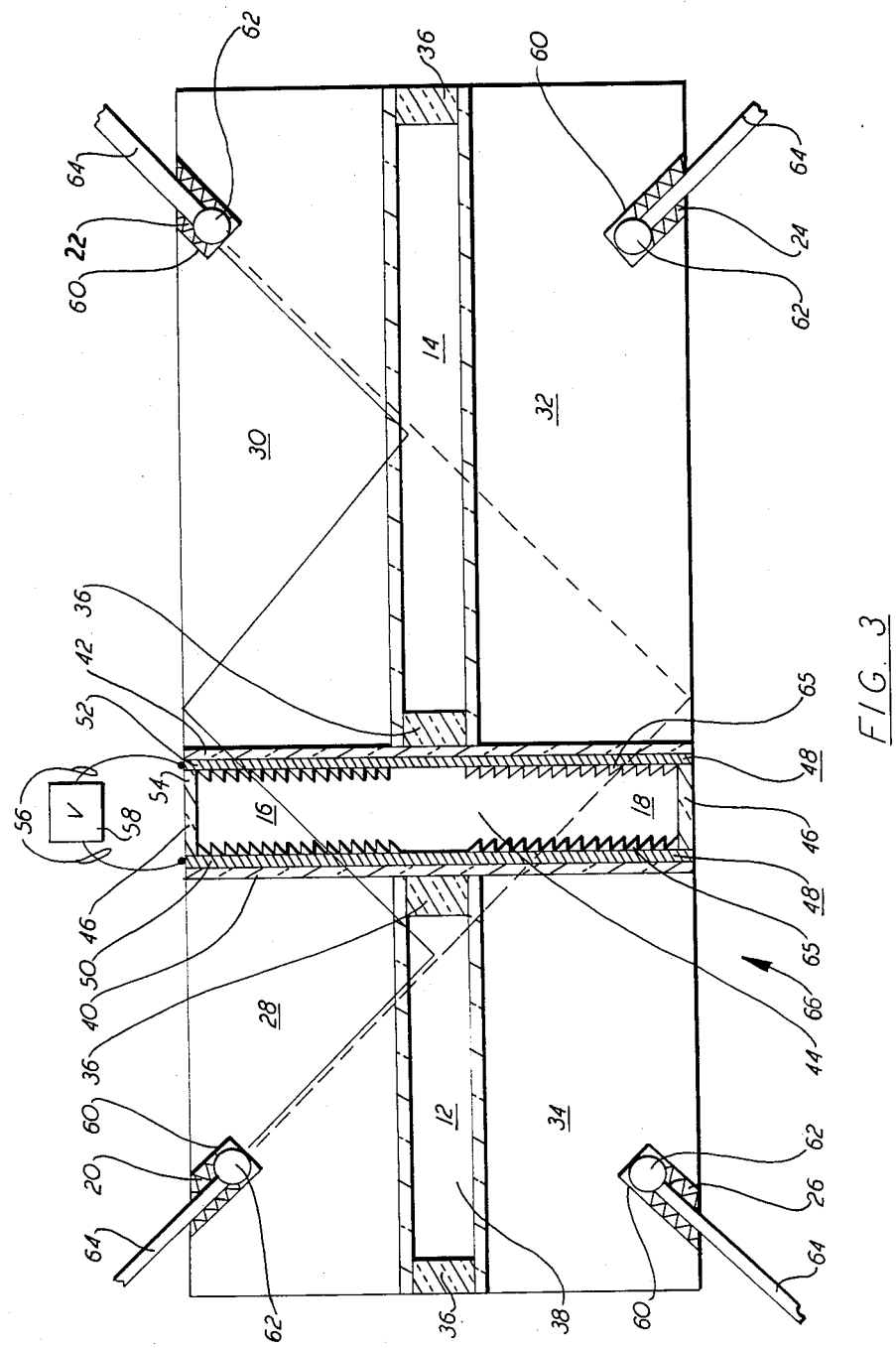
FIG. 3 is a cross sectional view of another embodiment of a liquid crystal wave division device embodying the principles of the present invention.

A second embodiment, generally indicated at 66 in FIG. 3 and embodying the principles of the present invention, is configured such that the first and second preselected frequency polarization changing means, 16 and 18, are in the path of the split components prior to the reflection thereof by the transparent member/air interfaces. For convenience, reference numerals designating particular elements in FIGS. 1 and 2 are used to designate similar elements in FIG. 3. In addition, the embodiment shown in FIG. 3 includes a discrete beam splitting means 12 positioned between the first transparent member 28 and the second transparent member 34. The discrete beam splitting cell can, in one embodiment, be a liquid crystal cell, or alternatively, can be a cross polarized quarter wavelength plate. In addition, the means 14 for recombining the components of the split light beam is a discrete liquid crystal cell. Further, the first and second preselected frequency polarization changing means, 16 and 18, respectively, are formed in a single discrete nematic liquid crystal cell. The operation of the device 66 shown in FIG. 3 is identical to that discussed above with respect to the device 10 shown in FIGS. 1 and 2.

The liquid crystal wave division devices, 10 and 66, are advantageous in that a preselected frequency portion of a multifrequency incident light beam can be separated from the other frequencies and thus isolated. Similarly, since the devices, 10 and 66, are fully bidirectional, a light beam having a preselected frequency can be multiplexed, or added to, an incident light beam having other frequencies. In addition, the devices, 10 and 66, require considerably less voltage to effect the switching between the output ports, 22 and 24. For example, those devices shown in the above-referenced U.S. Patent Application entitled Liquid Crystal Optical Switching Device and in U.S. patent applications Ser. Nos. 795,151 and 795,155 entitled Liquid Crystal Optical Switching Device having Minimized Internal Light Path, and Liquid Crystal Optical Switching Device Having Reduced Crosstalk, respectively, all filed on even date herewith and assigned to the assignee hereof. These above referenced patent applications are deemed incorporated herein by reference. Therein, a typical voltage for switching a light beam between the output ports thereof would be on the order of about 30 volts. The devices, 10 and 66, as described herein require less than about 5 bolts applied to each of the polarization changing means, 16 and 18.

Although the present invention has been described herein with respect to specific exemplary embodiments, it will be understood that other arrangements and configurations may be developed that nevertheless do not depart from the spirit and scope of the present invention. Hence, the present invention is deemed limited only by the appended claims and a reasonable interpretation thereof.

What is claimed is:

1. A liquid crystal wave division device comprising:
    means for splitting a multifrequency incident light beam into first and second polarized components, said means including a liquid crystal material;
    means for selectively changing the polarization of a preselected frequency portion of said polarized components, said preselected frequency polarization changing means having first and second boundary members, said first boundary member being positioned in the path of said first and second polarized components, a homogeneously aligned liquid crystal material disposed between said first and second boundary members and means for sustaining an electromagnetic field in said liquid crystal material; and
    means for recombining said components whereby said preselected frequency portion of said two components are directed to one of two different output ports.

2. Device as claimed in claim 1 wherein said means for splitting said incident light beam includes a first discrete cell, said first cell including said liquid crystal material.

3. Device as claimed in claim 1 wherein said means for recombining said components of said incident light beam includes a liquid crystal material.

4. Device as claimed in claim 3 wherein said means for recombining said components of said incident light beam includes a second discrete cell, said second cell including said liquid crystal material.

5. Device as claimed in claim 3 wherein said liquid crystal material of said beam splitting means and said liquid crystal material of said beam component recombining means are included in a single discrete cell.

6. Device as claimed in claim 1 wherein said sustaining means includes first and second spaced apart electrodes.

7. Device as claimed in claim 6 wherein said first electrode is disposed over said first boundary member and said second electrode is disposed over said second boundary member.

8. Device as claimed in claim 1 further comprising:
    means for retaining said liquid crystal material between said first and second boundary members.

9. Device as claimed in claim 1 further comprising:
    a first transparent member having a first input port associated therewith, said first transparent member being disposed such that a light beam from said first input port is incident upon said light beam splitting means; and
    second and third transparent members having said output ports associated therewith, said second and third transparent members being disposed such that a light beam from said recombining means is directed to one of said output ports.

10. Device as claimed in claim 9 further comprising:
    a fourth transparent member having a second input port associated therewith, said fourth transparent member being disposed such that a light beam from said second input port is incident upon said light beam splitter.

11. Device as claimed in claim 10 wherein said first and third transparent members are spaced apart by said preselected frequency polarization changing means; said second and third transparent members are spaced apart by said preselected frequency polarization changing means, said first and fourth transparent members are spaced apart by said beam splitting means and said second and third members are spaced apart by said recombining means.

12. Device as claimed in claim 11 wherein said first and said fourth transparent members each include means for redirecting said first and second polarized components toward said recombining means.

13. A liquid crystal wave division device; said device comprises:
    means for splitting a multifrequency incident light beam into first and second polarized components;
    means for selectively changing the polarization of a preselected frequency portion of said polarized components, said preselected frequency polarization changing means including a first preselected frequency polarization changing cell, said first preselected frequency polarization changing cell being disposed in the path of one of said polarized components and a second preselected frequency polarization changing cell, said second preselected frequency polarization changing cell being disposed in the path of the other polarized components; and means for recombining said components whereby said preselected frequency portion of said two components are directed to one of two different output ports 14. Device as claimed in claim 13 wherein each said preselected frequency polarization changing cell includes:

first and second boundary members;

a homogeneously aligned liquid crystal material disposed between said first and second boundary members; and means for sustaining an electromagnetic field in said liquid crystal material.

15. Device as claimed in claim 14 wherein each said electromagnetic field sustaining means includes first and second spaced apart electrodes.

16. Device as claimed in claim 14 wherein each said preselected frequency polarization means further comprises:

means for orienting the molecules of said liquid crystal material proximate said boundary members normal to said polarized components of said multi-frequency incident light beam.

17. Devices as claimed in claim 16 wherein said orienting means includes a molecular alignment layer deposited over said electrodes at an angle about equal to the complement of the angle of said polarized components with respect to said molecules of said liquid crystal material proximate said boundry members.

18. Device as claimed in claim 14 wherein said boundary members are spaced apart such that the distance (d) traveled therein by said preselected frequency polarized components is determined by:

$$d = \frac{R\lambda}{2\pi\Delta n}$$

wherein: R is the retardation of a light wave having a wavelength $\Delta n$ is the birefringence of said liquid crystal material, and $\lambda$ is the wavelength of the preselected frequency.

19. Device as claimed in claim 18 wherein said distance is equal to any interger multiple of $\pi$ times d.

* * * * *